Dec. 16, 1952     F. A. ANETSBERGER ET AL     2,621,613
DOUGH ROLLING APPARATUS
Filed March 21, 1950                                                4 Sheets-Sheet 1
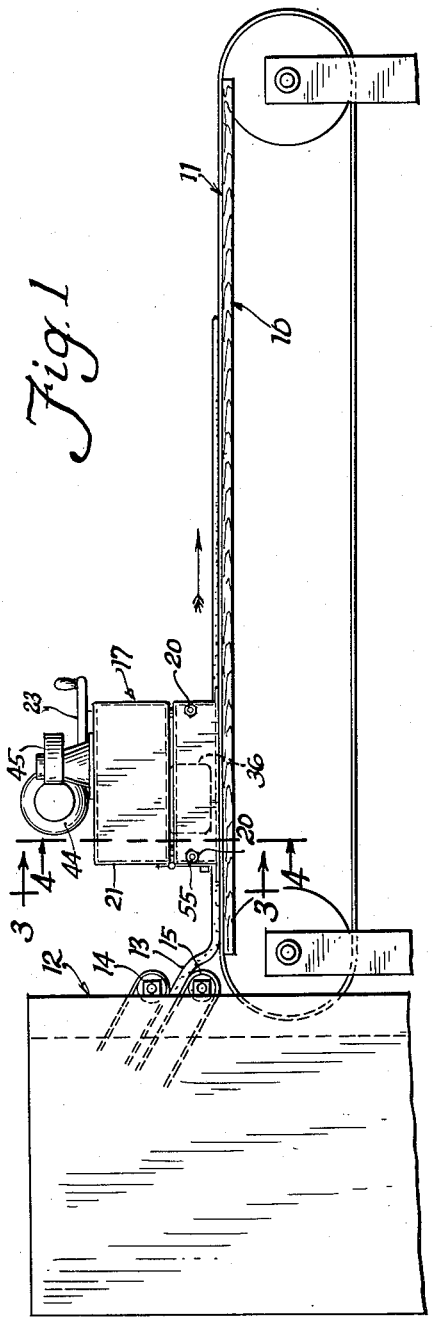
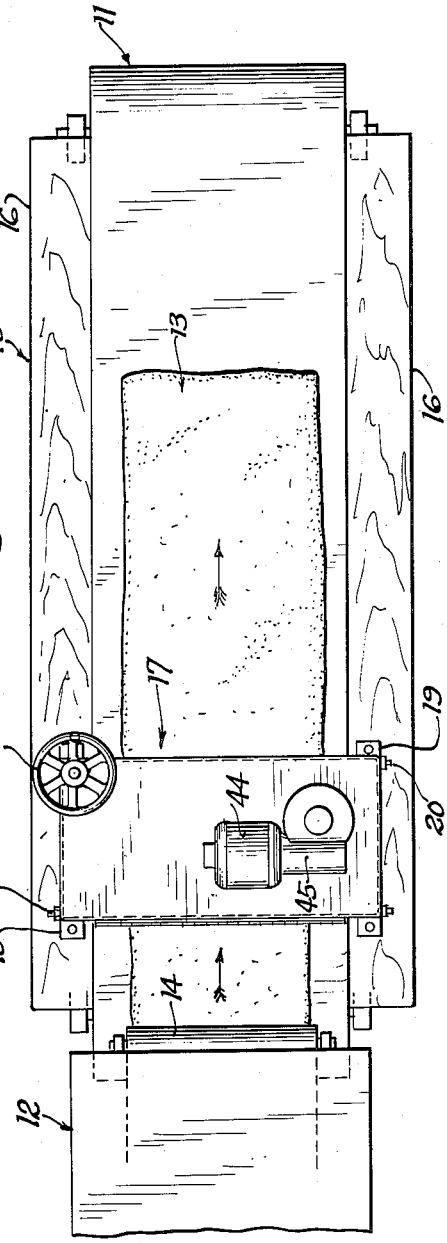
INVENTORS.
Frank A. Anetsberger
Dean H. Whitehead
BY
Sheridan, Davis & Cargill
Att'ys Dec. 16, 1952       F. A. ANETSBERGER ET AL       2,621,613
DOUGH ROLLING APPARATUS
Filed March 21, 1950                             4 Sheets-Sheet 2
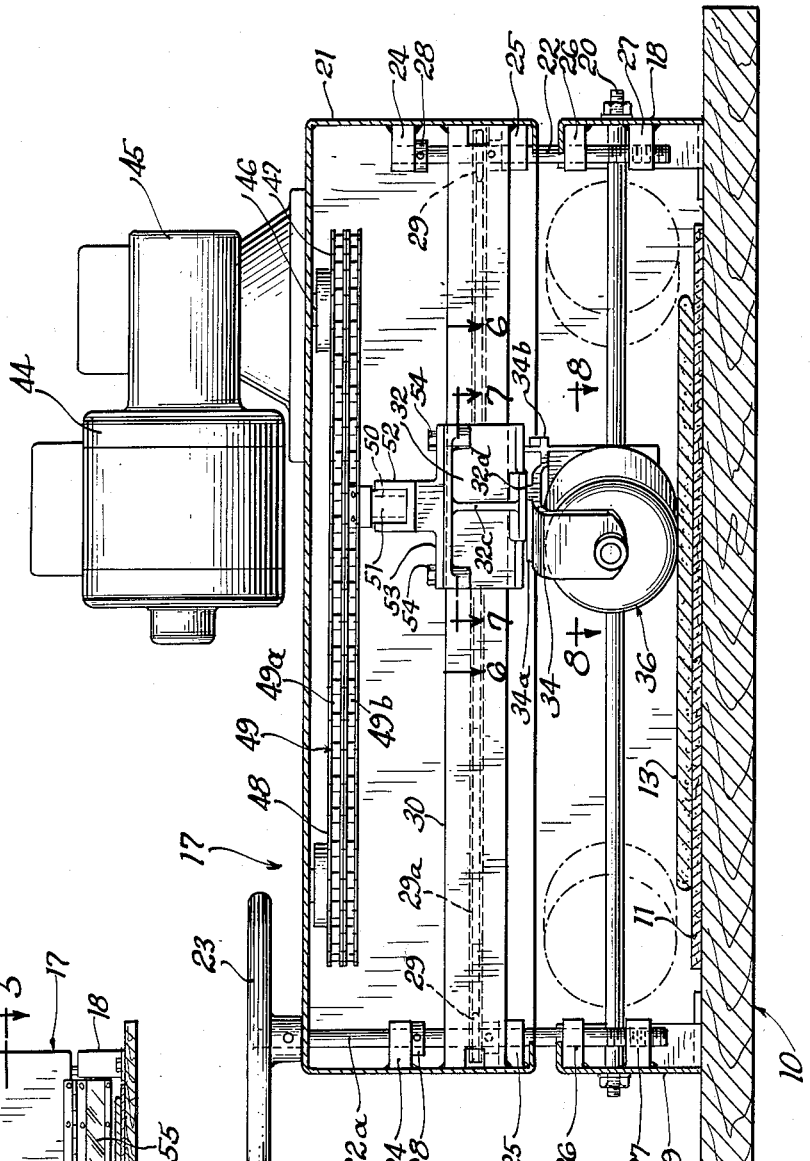
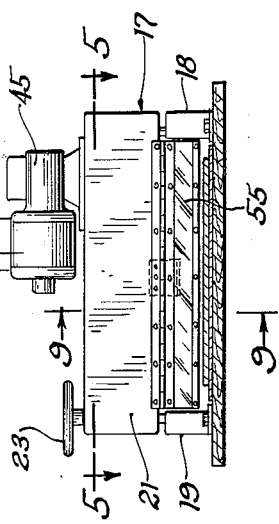
INVENTORS.
Frank A. Anetsberger
Dean H. Whitehead
BY
Sheridan, Davis & Cargill
Att'ys Dec. 16, 1952  F. A. ANETSBERGER ET AL  2,621,613
DOUGH ROLLING APPARATUS Filed March 21, 1950  4 Sheets-Sheet 3

INVENTORS.
Frank A. Anetsberger
Dean H. Whitehead
BY Sheridan, Davis & Cargill
Attys Dec. 16, 1952     F. A. ANETSBERGER ET AL     2,621,613
DOUGH ROLLING APPARATUS
Filed March 21, 1950     4 Sheets-Sheet 4
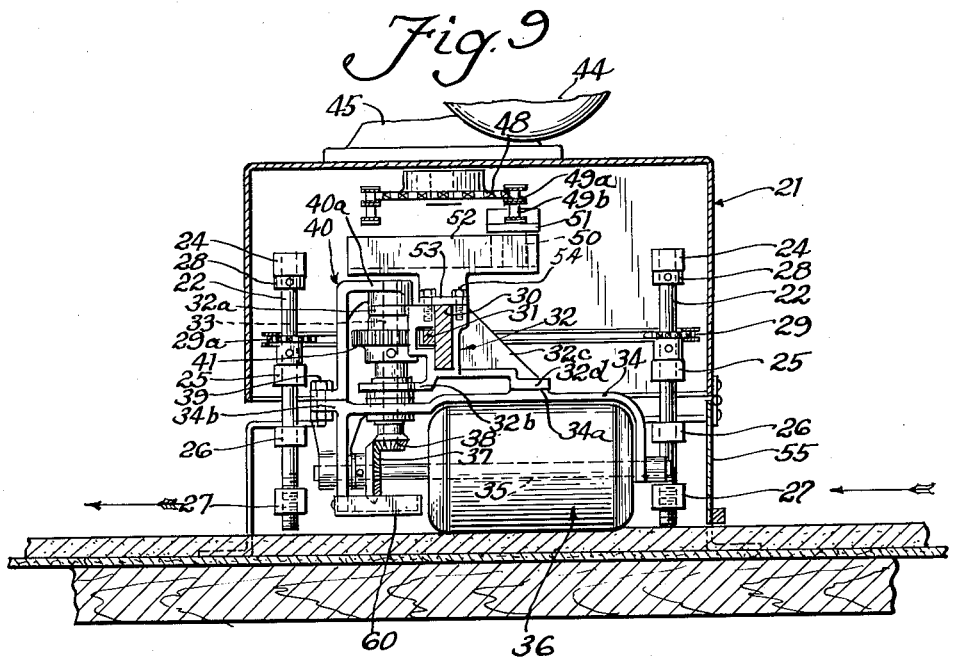
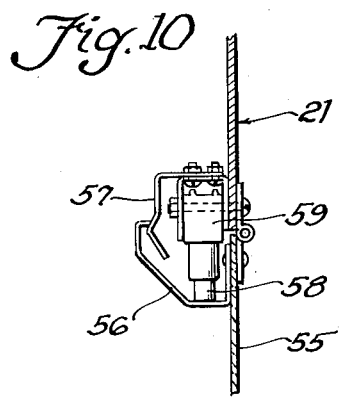 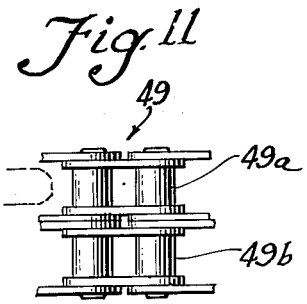
INVENTORS.
Frank A. Anetsberger
Dean H. Whitehead
BY
Sheridan, Davis & Cargill
Attys Patented Dec. 16, 1952

2,621,613

UNITED STATES PATENT OFFICE 2,621,613

DOUGH ROLLING APPARATUS

Frank A. Anetsberger, Chicago, and Dean H. Whitehead, Oak Park, Ill., assignors to Anetsberger Brothers, Inc., Northbrook, Ill., a corporation of Illinois Application March 21, 1950, Serial No. 150,872

12 Claims. (Cl. 107—12)

This invention relates to improvements in dough rolling apparatus. In bakeries having large capacity outputs of bakery products, dough sheeters frequently are employed for forming proofed dough into sheets of required thickness preparatory to cutting it into shapes for the particular products to be baked. In some instances after sheeting the dough, the sheet is cross rolled, not merely to reduce the thickness of the sheet but to improve its texture. Such cross rolling usually is performed by hand, rolling pins of conventional type generally being used by bakery helpers who stand beside the traveling belt of the work table and cross roll the dough as it progresses to die cutters or other apparatus located at stations along the table. The present invention relates to cross rolling apparatus and one object of the invention is to provide power operated mechanism that will satisfactorily cross roll a sheet of dough that is carried on a continuously moving conveyor of a work table or the like.

Another object of the invention is to provide mechanism for reciprocating a roller transversely of a moving sheet of dough and provided with means which not only rotates the roller but is arranged to effect shifting the angle of the axis of the roller at the beginning of each transverse stroke whereby the axis of the roller, instead of being parallel with the direction of movement of the dough sheet, is at an advantageous working angle with the end that extends in the direction of movement of the sheet constituting the leading end with respect to the transverse movements of the roller.

An additional object of the invention is to provide a cross roller mechanism that includes means that are actuatable during rolling operations for effecting ready adjustment of the roller vertically with respect to the conveyor across which the roller reciprocates whereby the sheet of dough can be reduced to the thickness required.

A further object of the invention is to provide means for supporting a roller of a dough rolling mechanism against upward deflection or cocking action out of a horizontal position.

Other objects of the invention relate to various features of construction and arrangement of parts which will be apparent from a consideration of the following specification and accompanying drawings wherein:

Figure 1 is a side elevation of a dough sheeting mechanism and a work table having a driven endless conveyor with the improved mechanism shown in position on the table;

Fig. 2 is a top plan view of the apparatus shown in Fig. 1;

Fig. 3 is a side elevational view of the cross roller apparatus with the table shown in section taken on line 3—3 of Fig. 1;

Fig. 4 is an enlarged sectional view taken on line 4—4 of Fig. 1;

Fig. 9 is a sectional view taken on line 9—9 of Fig. 5;

Fig. 10 is a broken view of a motor control safety switch that opens the motor circuit whenever a transparent guard is lifted to enable an attendant's hand to be inserted into the path of the roller; and Fig. 11 is a fragmentary view of a double sprocket chain that constitutes a portion of the motor driven, roller reciprocating mechanism.

Figure 5:
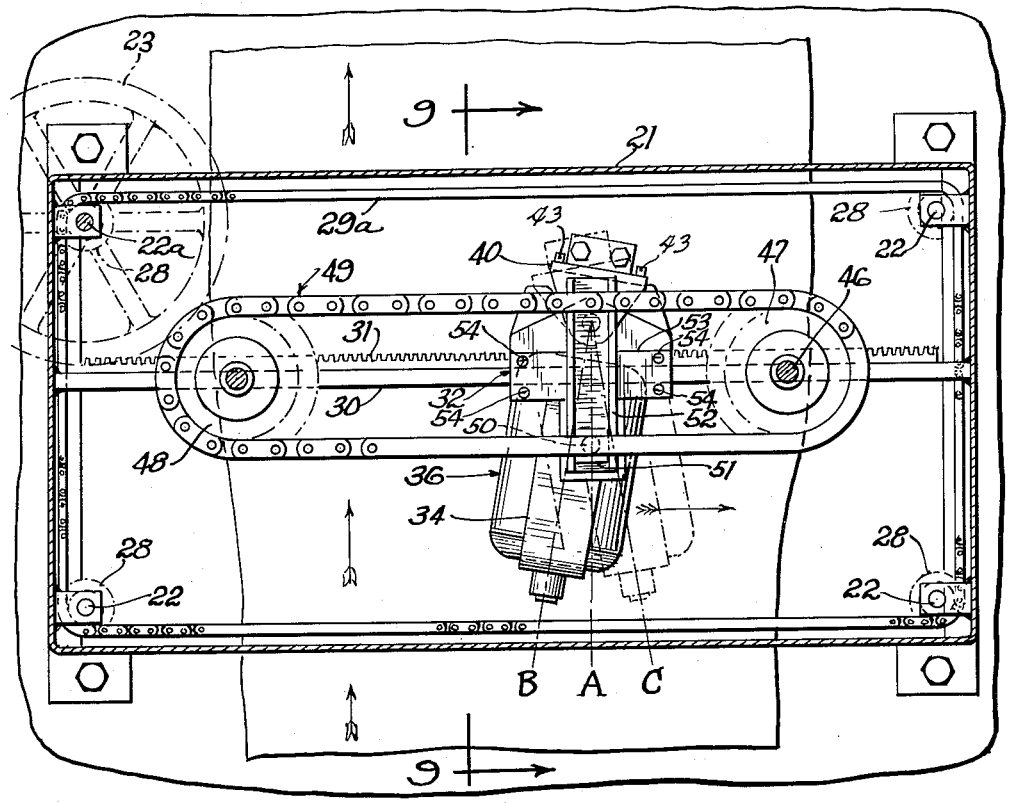
Fig. 5 is a sectional plan view taken on line 5—5 of Fig. 3.

In the drawing, Figs. 1 and 2 illustrate the improved cross roller mechanism mounted in operative position on a baker's work table 10 of the type having an endless conveyor 11 suitably driven preferably by variable speed drive means not shown. A dough sheeter 12 which is of known form and which constitutes no part of the present invention, is shown located adjacent an end of the table and, as is known, receives a mass of dough to be sheeted, the dough 13 in sheet form issuing from between a pair of sheeting belts 14 and 15 as illustrated. Other types of dough sheeting apparatus may, of course, be used with the present improvements.

The table 10, of the type shown, has longitudinal wings or shelves 16 along the sides, constituting lateral extensions of the table top which supports the upper run of the belt conveyor 11 which conveys the sheeted dough to the cross roller apparatus indicated generally by numeral 17 and from the latter to another or other devices (not shown) that operate on the dough as it progresses from left to right along the table.

The cross roller apparatus forming the subject matter of the present invention is shown as comprising two base members 18 and 19 which are mounted on the wings 16 on opposed sides of the conveyor 11 and are joined by a pair of transverse brace rods 20. Above the base formed by the members 18, 19 is a casing 21 which constitutes a frame or support for the cross roller mechanism and actuating means therefor. The casing 21 is vertically adjustable for raising and lowering the cross roller as required in rolling the dough sheet to the selected thickness. The means for raising and lowering the casing 21, in the form of the apparatus illustrated, consists of four posts in the form of vertical shafts 22 which are similar except that one, designated 22a extends upwardly through the top wall of the casing and is provided with a hand wheel 23 for rotating the shaft which, by means about to be described, effects vertical adjustment of the casing and hence of the roller.

The three shafts 22 and shaft 22a are located adjacent the corners of the casing and each extends through apertured guide bosses 24, 25 which may be welded to the inner walls of the casing. The shafts likewise extend through apertured bosses 26 and 27 in the base members 18 and 19. The lower boss 27 of each vertical pair of bosses is internally threaded, as is the lower end portion of each shaft 22, 22a whereby rotation of the respective shafts effects the raising or lowering of the shafts, depending on the direction of rotation thereof. A collar 28 is secured to each shaft beneath the boss 24 for supporting the latter and thus supporting the casing on the rotatable shafts which at the lower ends are supported by the threaded engagement with the bosses 27.

Each of the shafts 22, 22a is provided with a sprocket 29, secured thereto, the depending hubs of which are shown contacting the respective bosses 25 for affording further support for the superstructure consisting of the casing and the apparatus carried thereby. An endless horizontal sprocket chain 29a passes around the four sprockets, the sprockets being secured to the respective shafts whereby rotation of the shaft 22a by means of the hand wheel 23 will rotate all the shafts in unison and hence will elevate the superstructure, or lower it for the purpose above mentioned.

A transverse guide plate 30 is shown for supporting the reciprocating mechanism, the plate being attached to the side walls of the casing by any approved means preferably by welding. Along one of the vertical sides of the plate is attached a rack bar 31 (see Figs. 6 to 9, inclusive) although the rack may be formed as an integral part of the plate if desired. A slide member 32 shown in the form of a casting, having a pasage for accommodating the guide plate 30 and rack 31 is provided which is adapted to slide back and forth along the plate, the slide constituting the means for slidably securing the reciprocating apparatus to the guide plate. The slide 32 is shown with upper and lower laterally projecting arms 32a, 32b which are bored for receiving a vertical shaft 33. The slide 32 is also provided with a vertical web 32c which projects from the side thereof opposite the arms 32a, 32b and at the lower, outer end the web is provided with a horizontal foot 32d which is adapted for contact with a flat bearing portion 34a of a yoke 34 having depending arms in which the ends of a roller shaft 35 are journalled, the shaft having secured thereto the cross roller 36 for driven rotation by means of bevel gears 37 and 38, the former on the roller shaft and the latter on vertical shaft 33.

The yoke member 34 is provided, in the specific structure illustrated, with a flange 34b to which is secured, as by screws or bolts 39, a bracket 40 provided with a horizontal upper arm 40a that is bored and preferably bushed to form a bearing for the upper end of the shaft 33. Secured to the shaft 33 is a pinion 41 that extends through a recess 42 in the adjacent wall of the slide member 32 into constant meshing engagement with the teeth of the rack 31 whereby, when the slide 32, yoke 34 and bracket 40 are reciprocated along the guide plate 30, the pinion will rotate the shaft in opposite directions and thereby rotate the roller in opposite directions also. The structure above described enables the bracket 40 and the yoke 34 and thus the roller 36 to swing through limited arcs about the vertical shaft 34 as an axis, which swinging movement of the roller occurs at the beginning of each transverse stroke of the roller across the dough sheet and causes the roller to assume angular positions as it begins its transverse movements. Such angular positions are indicated in Fig. 5 where line A is a center line passing through the shaft 33 which is the axis of swinging movement. Line B indicates the longitudinal axis of the roller in one angular position as the roller moves to the right as viewed in Fig. 5 and line C indicates the axis of the roller in an angular position assumed by the roller as it moves to the left as viewed in Fig. 5. The angular positions indicated by lines B and C in Fig. 5 are not to be considered as fixed since means preferably are provided for controlling the range of the swinging movements of the roller for procuring the most satisfactory rolling action.

Figure 6:
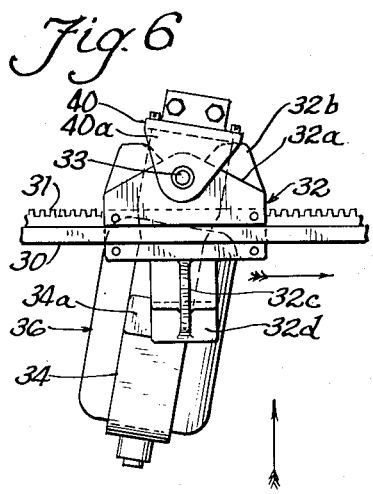
Fig. 6 is a fragmentary plan view of the roller and part of the supporting and operating structure as viewed from the plane of line 6—6 of Fig. 4.
Figure 7:
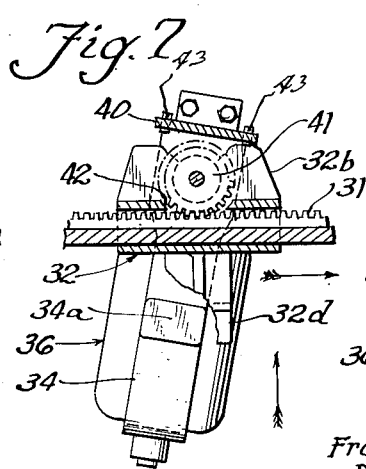
Fig. 7 is a broken sectional view of the structure shown in Fig. 6, and taken on line 7—7 of Fig. 4.
Figure 8:
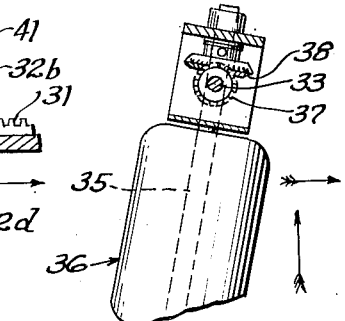
Fig. 8 is a sectional view of a portion of the roller driving means taken on line 8—8 of Fig. 4.

The means for controlling the range of swinging movements of the roller comprises a pair of set screws 43 located in the bracket 40 in the horizontal plane of the arm 32b of the slide 32. The inner ends of the screws are adapted to engage portions of the arm 32b, as indicated in Figs. 6 and 7 and thus to limit the arcs through which the swinging structure (comprising bracket 40, yoke 34 and roller 36) can move. The screws are shown in Figs. 6 and 7 in position to accommodate substantially the maximum swinging movement but by turning the screws inwardly, the permitted arc of swinging movement can be reduced. The swinging or arcuate movement of the roller 36 is caused by the planetary action of the pinion 38 on pinion 37 at positions off-center with respect to the shaft 33 which constitutes the axis of arcuate movement. As the pinion 37 begins rotation in one direction or the other at the beginning of each transverse passage of the slide 32, the pinion 37 tends to move with the pinion 38 about the axis of the shaft 33 and thus to swing the roller arcuately whereby the right hand end of the roller, as viewed in Fig. 9, will constitute the trailing end during the ensuing transverse movement. The roller rotating drive means thus shifts the roller arcuately at the beginning of each transverse passage of the roller across the dough sheet. Contact of the roller with the dough tends also to effect such shifting action of the roller. The rotation of the roller likewise is in a direction to assist rather than to retard the movement over the dough sheet since the direction of rotation is such that the portion of the roller surface in contact with the dough at a given instant is rearward with respect to the transverse movement across the dough sheet. Hence the driven roller in traversing the surface of a dough sheet is positively driven and the cross rolling action alters the surface texture of the sheet, as well as compressing or rolling it.

The means for reciprocating the described mechanism comprises a motor 44 shown mounted on the top of the casing 21 and arranged to drive, through a speed reducing mechanism 45 of known form, a vertical shaft 46 which extends into the casing and carries a sprocket 47. A companion idler sprocket 48 is also located in the casing, in horizontal alignment with sprocket 47 and around the two sprockets is trained a double sprocket chain 49, the upper chain section 49ᵃ of which meshes with the sprockets 47, 48. To the lower sprocket chain section 49ᵇ is attached a depending cylindrical pin 50 which extends into a bore in a slide block 51, the slide block being shown as square in plan view. The block is positioned in a channel of channel member 52 (see Fig. 4) which is of a length to accommodate back and forth movement of the block as the pin 50 is carried by the sprocket chain in the arcs corresponding to the circumferences of the sprockets 47, 48.

The channel member 52, within the channel of which the block 51 slides, is shown with a base 53 which is secured to the slide member 32 by screws 54. As shown in Fig. 9, the base 53 extends across and closes the channel that accommodates the transverse guide plate 30.

As the motor 44 operates, it drives the chain 49 and as the pin 50 moves with the chain it effects reciprocation of the roller and the roller carrying structure including the channel member 52, the slide 32, and bracket 40 and the roller carrying yoke 34. During such reciprocating movements, the pinion 41, meshing with the rack 31, rotates the shaft 33 as above described, thereby driving the roller shaft in the alternate directions as described above during successive transverse strokes of the roller across the dough sheet. As the pin 50 moves arcuately about the sprocket 47 or 48, the block 51 moves longitudinally of the channel member 32 and transverse action of the roller is decelerated and comes to a halt as the pin moves into alignment with the transverse line passing through the axes of the sprockets. As the pin passes arcuately beyond said line, reciprocation of the roller supporting structure begins in the other direction. Hence uni-directional operation of the chain 49 imparts to the roller carrying structure the reciprocating movements above described and during each transverse stroke of the roller drives the latter positively in a direction the same as that which would be imparted to it by mere rolling contact with the dough.

The length of the strokes imparted to the roller is greater, preferably, than the width of the dough sheet whereby at the instant when the roller slows down and comes to a halt at the end of each transverse stroke it will be beyond the margin of the dough sheet which travels at a uniform rate. Hence the stopping of the roller at each end of its transverse movements does not tend to impede and scuff up the moving dough sheet. The time required for a complete stroke of the roller is less than the time required for the sheet to advance a distance corresponding to the length of the roller whereby the roller operates in slightly overlapping paths and leaves the surface of the dough uniformly smooth. This relationship of movement of the roller relative to the movement of the dough sheet on the conveyor can be effected by use of a speed reducer of proper ratio but usually the conveyors of the type mentioned are provided with speed regulating means which permit the rate of linear movement of the dough to be adjusted relative to the movement of the dough roller.

As a safety measure, a transparent shield 55 is provided that extends between the side frames or base members 18, 19 at the forward side of the apparatus adjacent the path of travel of the roller as shown in Fig. 3. The transparent character of the shield enables an operator to note the operation of the roller but prevents inadvertent insertion of his hand into the path of the roller. If the shield is swung to open position, a resilient latch member 56 (see Fig. 10) is moved out of engagement with a resilient keeper 57 and permits a spring pressed plunger 58 of an electric switch 59 to move outwardly. The switch 59 is adapted to be connected in the circuit of the motor 44 for opening the circuit and stopping the roller whenever the shield 55 is swung outwardly from closed position. The use of the safety switch is optional.

In Fig. 9 a drip pan 60 is indicated beneath the gears 37, 38 for catching lubricant, etc. that may drop from the gears and the superjacent driving mechanism. A suitable control switch for the motor 44 (not shown) is mounted on the casing 21 or other location convenient to the attendant of the apparatus.

The improved mechanism, as described and illustrated, causes the roller 36 which preferably is of hard wood, such as maple and having rounded end portions, to move back and forth across the dough sheet as the latter is carried on the conveyor. The elevation of the roller, for controlling the pressure exerted thereby upon the dough sheet, can be varied by operation of the hand wheel 23 during operation of the roller. While the axis (shaft 33) about which the roller swings in a horizontal plane from one angular position to another at the beginning of each transverse stroke across the dough sheet is located beyond the left hand end of the roller as shown in Fig. 9, upward cocking or tilting action of the roller at the right hand end is avoided by the provision of the foot 32ᵈ of the slide member 32 which bears against the portion 32ᵈ of the yoke and hence the roller is retained with its axis horizontal under all working conditions.

In the drawing the end of the roller 36 adjacent the driven end of the shaft 35 is the leading end during the movements of the roller across the dough sheet due to angular positions assumed by the roller as described above. The trailing end of the roller (the right hand end thereof as viewed in Fig. 9 in which figure perspective has been omitted for the sake of simplicity) extends in the direction opposite the direction of movement of the dough sheet since such arrangement has been found to provide the most satisfactory rolling action.

While the structure shown and described represents a structure that is illustrative of the invention, various changes in the details of the apparatus may be made without departing from the scope of the invention defined by the accompanying claims.

What is claimed is:

1. Dough rolling mechanism comprising a supporting structure adapted to be mounted transversely of and above a movable conveyor for sheeted dough, a guide supported by said structure transversely of the conveyor, a slide reciprocable along said guide transversely of a moving dough sheet on the conveyor, a dough roller provided with a drive shaft, a member in which the roller drive shaft is journalled for rotation on a horizontal axis, means connecting said member to said slide for reciprocation of said slide on said guide for moving the roller back and forth across a strip of dough on the conveyor and means for positively rotating the roller during reciprocation thereof comprising a stationary rack bar secured to said structure and cooperating pinions carried by and reciprocable with said slide, one of said pinions meshing with the rack bar and driven thereby as the slide reciprocates and the other pinion secured to the roller shaft in operative engagement with and driven by said first pinion.

2. Dough rolling mechanism comprising a supporting structure adapted to be mounted transversely of and above a movable conveyor for sheeted dough, a guide supported by the structure transversely of the conveyor, a slide reciprocable along said guide, a vertical shaft supported by said slide, a roller support carried by said slide, a horizontal roller having a shaft journalled in said roller support, driving means interposed between said roller shaft and said vertical shaft, motor operated mechanism for reciprocating said slide and means for rotating said vertical shaft in one direction as the slide moves in one direction and reversing the direction of rotation of the shaft as the slide moves in the opposite direction for effecting rotation of the roller in directions that reverse at the beginning of each transverse passage of the roller across the conveyor.

3. Dough rolling apparatus comprising a supporting structure adapted for mounting in position to span a belt conveyor for sheeted dough, a guide supported by the structure for disposition transversely of the conveyor, a slide reciprocably mounted on the guide for movement transversely of the conveyor, means for reciprocating said slide on the guide, a toothed rack on the guide, a vertical shaft supported by the slide and provided with an operating pinion meshing with said rack for effecting rotation of the shaft in one direction as the slide moves in one direction and for operating the shaft in the opposite direction as the slide moves in the other direction, a roller support carried by said slide, a horizontal dough roller provided with a horizontal shaft journalled in said roller support and reciprocable with said slide, and driving means interposed between said shafts whereby rotation of said vertical shaft during reciprocating movements thereof with said slide imparts rotary movements to the roller that reverse in direction with each reversal in direction of reciprocating movement of the roller.

4. Dough rolling apparatus comprising a pair of base members each adapted for support on opposed sides of a conveyor for sheeted dough, a casing above said base members extending transversely of the conveyor, adjustable supporting means supporting said casing above said base and operable for varying the elevation of the casing, a guide member supported by the casing transversely of the conveyor, a rack bar on said guide extending longitudinally thereof, a reciprocable slide on said guide, a vertical shaft supported by the slide and provided with an operating pinion meshing with said rack whereby reciprocating movement of the slide on the guide imparts rotary movement to the shaft that changes in direction with change in direction of the reciprocating movements of the slide, a dough roller support carried by said slide, a horizontal dough roller provided with a shaft journalled in said support, means interposed between said shafts for effecting rotation of the roller in directions that change with each change in direction of reciprocating movement of the roller, and motor operated means for effecting reciprocation of the slide on the guide.

5. Dough rolling apparatus comprising a pair of base members each adapted for support on opposed sides of a conveyor for sheeted dough, a casing above said base members extending transversely of the conveyor, adjustable supporting means supporting said casing above said base and operable for varying the elevation of the casing, a guide member supported by the casing transversely of the conveyor, a rack bar on said guide extending longitudinally thereof, a reciprocable slide on said guide, a vertical shaft supported by the slide and provided with an operating pinion meshing with said rack whereby reciprocating movement of the slide on the guide imparts rotary movement to the shaft that changes in direction with change in direction of the reciprocating movements of the slide, a dough roller support carried by said slide, a horizontal dough roller provided with a shaft journalled in said support, means interposed between said shafts for effecting rotation of the roller in directions that change with each change in direction of reciprocating movement of the roller, and means for reciprocating said slide comprising a member carried by said slide and provided with a channel extending in a direction normal to said guide, a horizontally arranged motor-driven endless sprocket chain in the casing above said channel member with longitudinal runs thereof disposed parallel with said guide and provided with a pin depending into said channel for actuating the slide as the pin moves with the chain.

6. Dough rolling apparatus comprising a pair of base members each adapted for support on opposed sides of a conveyor for sheeted dough, a casing above said base members extending transversely of the conveyor, adjustable supporting means supporting said casing above said base and operable for varying the elevation of the casing, a guide member supported by the casing transversely of the conveyor, a rack bar on said guide extending longitudinally thereof, a reciprocable slide on said guide, a vertical shaft supported by the slide and provided with an operating pinion meshing with said rack whereby reciprocating movement of the slide on the guide imparts rotary movement to the shaft that changes in direction with change in direction of the reciprocating movements of the slide, a dough roller support carried by said slide, a horizontal dough roller provided with a shaft journalled in said support, means interposed between said shafts for effecting rotation of the roller in directions that change with each change in direction of reciprocating movement of the roller, and means for effecting reciprocation of the slide on said guide comprising a pair of horizontally disposed sprockets supported in the casing above said guide adjacent opposite ends of the casing, an endless sprocket chain trained about said sprockets and having longitudinal runs arranged parallel with said guide, a motor for operating one of said sprockets for effecting movement of the chain, a member secured to said slide and having an open channel arranged transversely of said chain runs, and a pin secured to the chain and adapted to move therewith and extending into said channel for reciprocating the channel member and slide along said guide.

7. Dough rolling mechanism comprising a supporting structure adapted for disposition transversely of an endless conveyor for sheeted dough, said structure comprising a vertically adjustable casing, a guide supported by the casing and disposed transversely of the path of travel of a sheet of dough on the conveyor, a slide on the guide adapted for reciprocating movement longitudinally thereof, a motor operated mechanism provided with means operatively engaging said slide for effecting reciprocating movement of the slide, a horizontally disposed dough roller carried by the slide for movement back and forth across the dough sheet as the latter moves with the conveyor, and means comprising a plurality of vertical movable elevator posts supporting the casing and provided with means for conjointly raising and lowering the posts for raising and lowering said casing with respect to the conveyor for adjusting the roller to selected planes of operation.

8. Dough rolling apparatus comprising a pair of base members adapted for disposition on opposed sides of a work table provided with a longitudinally moving belt conveyor adapted to pass between said base members, a plurality of vertical posts threadedly supported by said base members, a casing supported by said posts, motor actuated reciprocating means supported by the casing and movable in directions transversely of said conveyor, a roller carried by said reciprocating means for rolling action across a strip of dough moving on the conveyor, and means for rotating said posts in unison in either direction with respect to the threaded supports thereof for raising and lowering said casing, said actuating means and said roller for varying the plane of operation of the roller with respect to the dough strip.

9. Dough rolling apparatus comprising a pair of base members adapted for disposition on opposed sides of a work table provided with a longitudinally moving belt conveyor adapted to pass between said base members, a plurality of vertical posts threadedly supported by said base members, a casing supported by said posts, motor actuated reciprocating means supported by the casing and movable in directions transversely of a said conveyor, a roller carried by said reciprocating means for rolling action across a strip of dough moving on the conveyor, and means for rotating said posts in unison in either direction with respect to the threaded supports thereof for raising and lowering said casing, said actuating means and said roller for varying the plane of operation of the roller with respect to the dough strip, said means for rotating said posts in unison comprising manual operating means on one post for rotating the same, sprockets on the posts disposed in a horizontal plane, and an endless sprocket chain trained around the sprockets whereby rotation of said manual operating means effects corresponding concurrent rotation of the other posts.

10. Apparatus for rolling dough moving on a belt conveyor comprising a supporting structure arranged transversely of the conveyor, a roller disposed with the axis generally in a position parallel to the direction of movement of the conveyor, a motor operated mechanism comprising reciprocal means supporting the roller for reciprocation transversely of and in contact with the dough on the moving conveyor, a transverse rack bar and mechanism carried by and reciprocal with the reciprocal means comprising a pair of operatively engaging pinions, one meshing with said rack bar and the other operatively engaging said roller and driven by the first pinion for effecting positive rotation of the roller in directions that reverse with each change in direction of the reciprocating movement of the roller.

11. Apparatus for rolling a strip of dough moving on a belt conveyor comprising a horizontal roller, a yoke member in which the roller is journalled, a vertical shaft on which the yoke is mounted adjacent one end for limited swinging movement relative to the shaft for effecting disposition of the roller in angular positions on opposite sides of a line passing through said shaft parallel to the direction of movement of the conveyor, means for reciprocating said shaft and yoke and said roller transversely of the dough sheet with the roller in rolling contact with the sheet, and means for shifting the roller from one of said angular positions to the other at the beginning of each passage of the roller across the sheet and for positively rotating the roller.

12. Apparatus for rolling a strip of dough moving on a belt conveyor comprising a horizontal roller, a yoke member in which the roller is journalled, a vertical shaft on which the yoke is mounted adjacent one end for limited swinging movement relative to the shaft for effecting disposition of the roller in angular positions on opposite sides of a line passing through said shaft parallel to the direction of movement of the conveyor, means for reciprocating said shaft and yoke and said roller transversely of the dough sheet with the roller in rolling contact with the sheet, means for shifting the roller from one of said angular positions to the other at the beginning of each passage of the roller across the sheet and for positively rotating the roller, and means for raising and lowering the roller for varying the compressing action of the same on the dough sheet.

FRANK A. ANETSBERGER.
DEAN H. WHITEHEAD.

REFERENCES CITED

The following references are of record in the file of this patent:

UNITED STATES PATENTS

| Number | Name | Date |
| --- | --- | --- |
| 745,018 | Kessler | Nov. 24, 1903 |
| 806,869 | Burns | Dec. 12, 1905 |
| 893,005 | Mitchell | July 14, 1908 |
| 975,932 | Callow | Nov. 15, 1910 |
| 2,500,479 | White | Mar. 14, 1950 |